United States Patent
Kuiken et al.

(10) Patent No.: US 7,676,220 B2
(45) Date of Patent: Mar. 9, 2010

(54) METHOD AND APPARATUS FOR DYNAMIC VOICE RESPONSE MESSAGES

(75) Inventors: David Paul Kuiken, Round Rock, TX (US); David Jonathan Patschke, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 11/382,786

(22) Filed: May 11, 2006

(65) Prior Publication Data
US 2007/0275698 A1 Nov. 29, 2007

(51) Int. Cl.
*H04M 1/725* (2006.01)
(52) U.S. Cl. .................. 455/412.2; 455/412.1; 455/413; 455/415; 455/566
(58) Field of Classification Search ............... 455/412.2, 455/412.1, 413, 415, 566
See application file for complete search history.

(56) References Cited

U.S. PATENT DOCUMENTS

| | | | | |
|---|---|---|---|---|
| 4,420,656 A | * | 12/1983 | Freeman | 379/73 |
| 4,591,664 A | * | 5/1986 | Freeman | 379/73 |
| 4,847,889 A | * | 7/1989 | Eswaran | 379/88.24 |
| 5,926,385 A | * | 7/1999 | Lee | 700/38 |
| 5,987,414 A | * | 11/1999 | Sabourin et al. | 704/270 |
| 6,411,687 B1 | * | 6/2002 | Bohacek et al. | 379/88.21 |
| 7,292,680 B1 | * | 11/2007 | Simpson | 379/88.18 |
| 2002/0025026 A1 | * | 2/2002 | Gerszberg et al. | 379/67.1 |
| 2005/0276393 A1 | * | 12/2005 | Keohane et al. | 379/88.13 |

\* cited by examiner

*Primary Examiner*—Joseph H Feild
*Assistant Examiner*—Huy D Nguyen
(74) *Attorney, Agent, or Firm*—Yee & Associates, P.C.; Jill A. Poimboeuf (57) ABSTRACT

A computing device implemented method, apparatus, and computer program product to generate dynamic voice response messages in a mobile computing device. In response to receiving an incoming call from a caller, the process displays a list of response messages in a set of response messages. In response to receiving a selection of a response message from the list of response messages, the process sends the selected response message to the caller.

3 Claims, 5 Drawing Sheets

METHOD AND APPARATUS FOR DYNAMIC VOICE RESPONSE MESSAGES

BACKGROUND OF THE INVENTION

1. Field of the Invention

The present invention is related generally to an improved data processing system, and in particular to a method, apparatus, and computer program product for managing phone messages. In particular, the present invention is directed to a method, apparatus, and computer program product for generating dynamic voice response messages in a mobile computing device.

2. Description of the Related Art

Many mobile computing devices now have baseband processors or transceivers that provide receiver and transmitter operations for wireless communications, such as telephone calls and instant messaging. Wireless communications enabled mobile computing devices include, for example, cellular phones, laptops, tablet computers, and personal digital assistants (PDAs), such as Palm OS® and Windows Mobile® Pocket PC. Among the phone features most often included by a wireless communications provider is a voice mail service.

A voice mail service generally operates by sending a prerecorded message to a caller when a user is unable to answer a phone call. A user may be unable to answer the phone for a number of reasons. For example, the user may be talking to someone else on the phone or may be in a meeting or conference that cannot be disrupted by accepting a phone call. During these circumstances, current voice mail systems send a single prerecorded or default message to all callers. The prerecorded message typically states that the user is unable to answer the phone and asks the caller to leave a message. A caller is then given an opportunity to record a message for the user.

Current voice mail systems are static answering systems. When a user does not answer a call, every caller is connected to the voice mail answering system that sends the same outgoing message to all callers. Although a user can personalize the static prerecorded outgoing message by recording the user's own message, the same static message is sent to all callers.

Current voice mail systems typically permit a user to record a different voice mail message for a no-answer outgoing message as opposed to a busy-signal outgoing message. For example, the same no-answer outgoing message is sent to all callers that are connected to the voice mail system when a call is not answered after a preset number of rings or when a call is diverted to voice mail by a user. Likewise, the same busy-signal outgoing message is sent to all callers that are connected to the voice mail system due to a busy signal on the user's phone. In addition, some message systems send a particular response message to a caller based on the caller's phone number. However, the same static prerecorded message is sent to the caller each time the user is unable to answer the caller's incoming call.

SUMMARY OF THE INVENTION

The aspects of the present invention provide a computing device implemented method, apparatus, and computer program product to generate dynamic voice response messages in a mobile computing device. In response to receiving an incoming call from a caller, the process displays a list of response messages in a set of response messages. In response to receiving a selection of a response message from the list of response messages, the process sends the selected response message to the caller.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

With reference now to the figures and in particular with reference to FIGS. 1-7, exemplary diagrams of data processing environments are provided in which illustrative embodiments may be implemented. It should be appreciated that FIGS. 1-7 are only exemplary and are not intended to assert or imply any limitation with regard to the environments in which illustrative embodiments may be implemented. Many modifications to the depicted environments may be made without departing from the spirit and scope of the illustrative embodiments.

Figure 1:
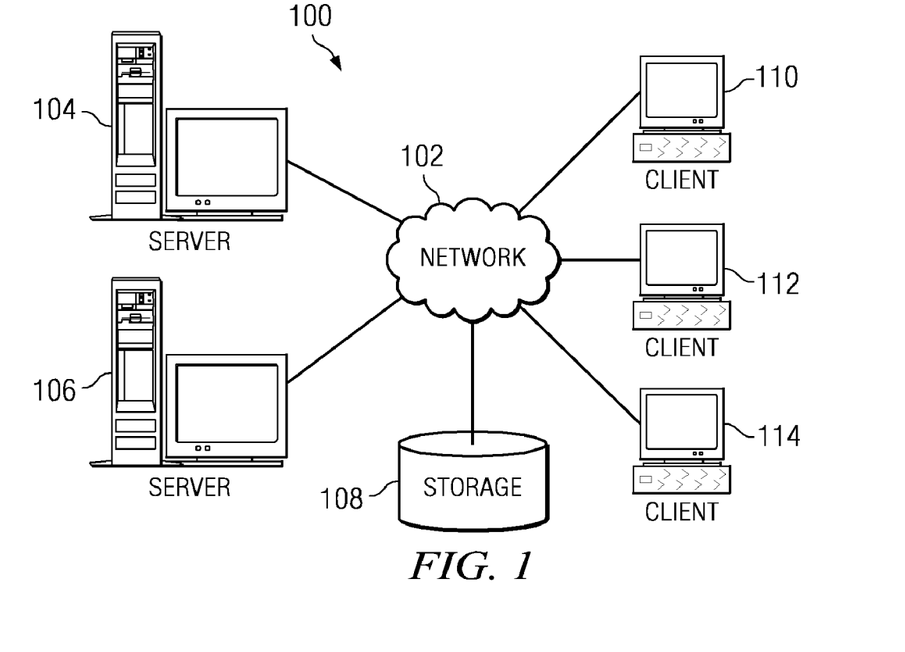
FIG. 1 is a pictorial representation of a network of data processing systems in which illustrative embodiments may be implemented.

With reference now to the figures, FIG. 1 depicts a pictorial representation of a network of data processing systems in which illustrative embodiments may be implemented. Network data processing system 100 is a network of computers in which illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Figure 2:
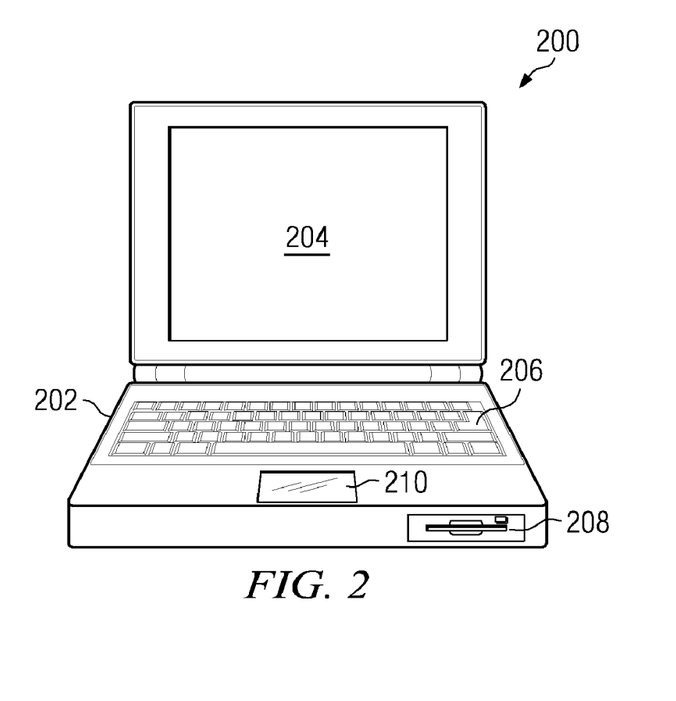
FIG. 2 is a pictorial representation of a data processing system in which illustrative embodiments may be implemented.

With reference now to FIG. 2, a pictorial representation of a data processing system is shown in which illustrative embodiments may be implemented. A mobile computer 200 is depicted which includes system unit 202, video display terminal 204, keyboard 206, storage devices 208, which may include floppy drives and other types of permanent and removable storage media, and pointer device 210. Additional input devices may be included with mobile computer 200, such as, for example, a mouse, joystick, touch screen, trackball, microphone, and the like. Mobile computer 200 can be implemented using any suitable computer, such as an IBM Thinkpad computer, which is a product of International Business Machines Corporation, located in Armonk, N.Y. Computer 200 also preferably includes a graphical user interface (GUI) that may be implemented by means of systems software residing in computer readable media in operation within computer 200.

Figure 3:
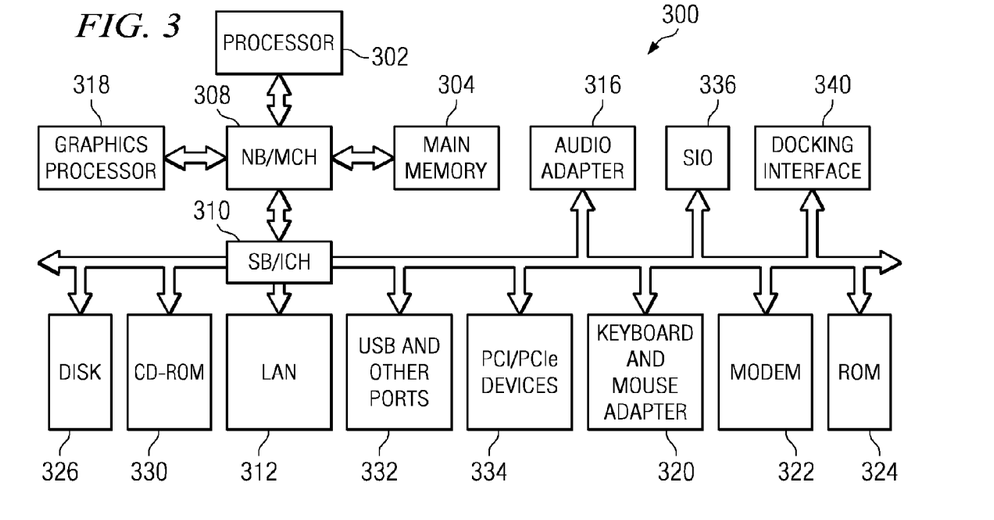
FIG. 3 is a block diagram of a data processing system in which illustrative embodiments may be implemented.

With reference now to FIG. 3, a block diagram of a data processing system is shown in which illustrative embodiments may be implemented. Data processing system 300 is an example of a mobile computer, such as computer 200 in FIG. 2, in which code or instructions implementing the processes of the illustrative embodiments may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

Data processing system 300 may be a mobile computing device, such as a laptop computer, tablet PC, or handheld computer. A docking interface may also be connected to the ICH. The docking interface provides port replication to allow the data processing system to easily connect to a keyboard, pointing device, monitor, printer, speakers, etc. The docking interface allows the mobile computing device to operate as a desktop computer with the more immobile peripheral devices.

An operating system runs on processor 302 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302. The processes of the illustrative embodiments are performed by processor 302 using computer implemented instructions, which may be located in a memory such as, for example, main memory 304, read only memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent nonvolatile memory, or optical disk drives and the like, may be used in addition to or in place of the hardware depicted in FIG. 3. Also, the processes of the illustrative embodiments may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer or telephone device in addition to taking the form of a personal digital assistant.

Figure 4:
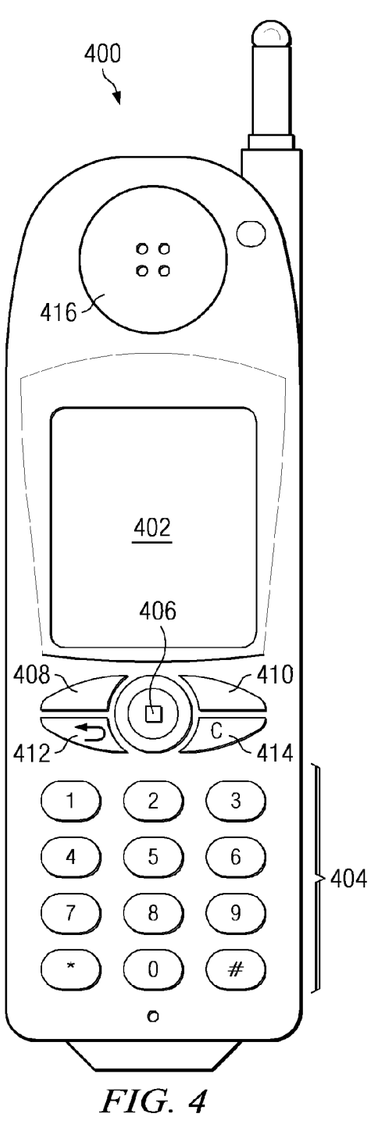
FIG. 4 depicts a mobile telephone in which illustrative embodiments may be implemented.

FIG. 4 is a mobile telephone in which illustrative embodiments may be implemented. Mobile phone 400 includes screen 402, which is capable of displaying pictures and text. Additionally, mobile phone 400 also includes numeric keypad 404, joystick 406, and buttons 408, 410, 412, and 414 placed around the joystick 406. These buttons are used to initiate various functions in mobile phone 400. These functions include for example, activating a menu, displaying a calendar, or initiating a call.

Mobile phone 400 also includes camera 416, which may be used to take pictures or videos depending on the implementation.

Figure 5:
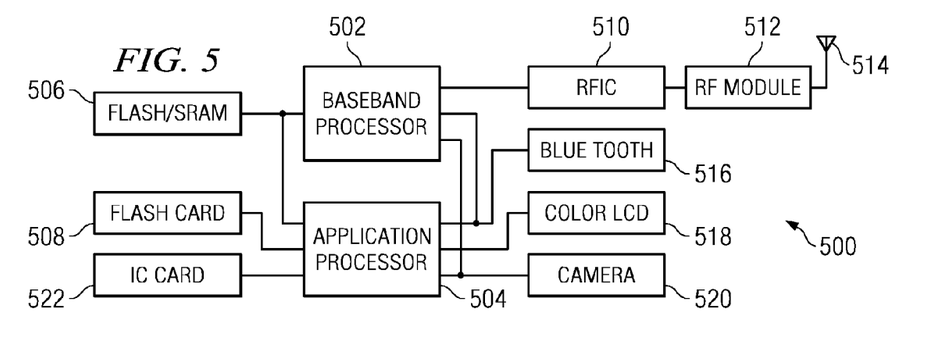
FIG. 5 is a block diagram of a camera phone in which illustrative embodiments may be implemented.

FIG. 5 is a block diagram of a camera phone in which illustrative embodiments may be implemented. Camera phone 500 includes baseband processor 502, application processor 504, flash/static random access memory (SRAM) 506, flash card 508, radio frequency integrated circuit (RFIC) 510, radio frequency (RF) module 512, antenna 514, Blue Tooth unit 516, color liquid crystal display (LCD) 518, camera 520, and IC card 522.

Baseband processor 502 provides for receiver and transmitter operations and is also referred to as a transceiver. In particular, baseband processor 502 handles all audio, signal, and data processing needed to receive and send data using RF transmissions or Blue Tooth transmissions. Application processor 504 provides the processing power for other functions within camera phone 500. For example, calculators, calendars, alarms, camera functions, and directories are provided through application processor 504. Flash/SRAM 506 is a storage device in which various instructions for providing the functions within camera phone 500 are located and provide upgrades. Flash card 508 is a storage device in which user data and applications may be stored. An example of flash card 508 is a secure digital card.

A pathway for the transmission of voice and other types of data is through RFIC 510. Additionally, short range transmissions may be sent or received through Blue Tooth unit 516. Blue Tooth unit 516 conforms to Blue Tooth wireless specification, which defines the link layer and application layer for product developers. Both of these transmissions are made through antenna 514 in this illustrative example.

Color LCD 518 provides a display for pictures and other data for camera phone 500. Camera 520, in this example, is a complementary metal oxide semiconductor (CMOS) camera which may be built into camera phone 500 or connected to camera phone 500 as a module, such as IC card 522. IC card 522 also may contain other application specific functions, such as a global positioning system (GPS) or other functions, such as a modem or additional memory.

Figure 6:
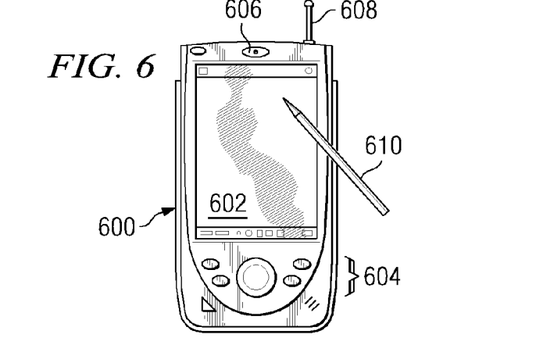
FIG. 6 is a diagram of a client in the form of a personal digital assistant in which illustrative embodiments may be implemented.

FIG. 6 is a diagram of a client in the form of a personal digital assistant in which illustrative embodiments may be implemented. Personal digital assistant 600 includes a display 602 for presenting textual and graphical information. Display 602 may be a known display device, such as a liquid crystal display (LCD) device. The display may be used to present a map or directions, calendar information, a telephone directory, or an electronic mail message. In these examples, screen 602 may receive user input using an input device such as, for example, stylus 610.

Personal digital assistant 600 may also include keypad 604, speaker 606, and antenna 608. Keypad 604 may be used to receive user input in addition to using screen 602. Speaker 606 provides a mechanism for audio output, such as presentation of an audio file. Antenna 608 provides a mechanism used in establishing a wireless communications link between personal digital assistant 600 and a network, such as network 200 in FIG. 2.

Personal digital assistant 600 also preferably includes a graphical user interface that may be implemented by means of systems software residing in computer readable media in operation within personal digital assistant 600.

Figure 7:
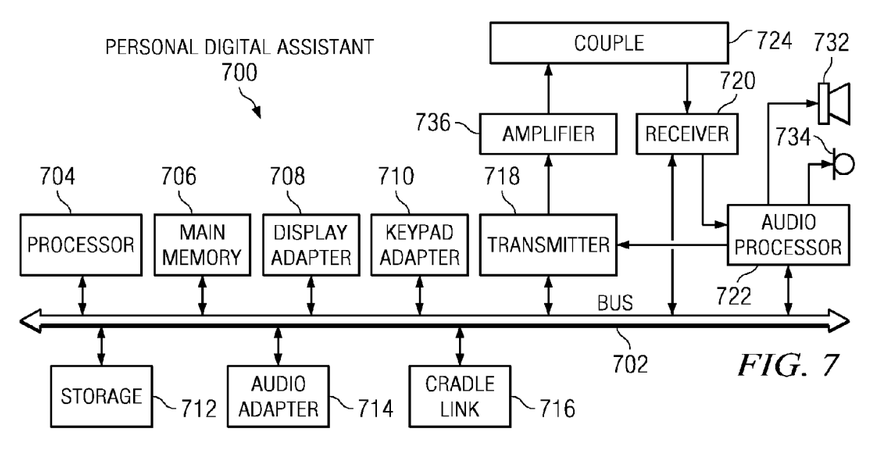
FIG. 7 a block diagram of a personal digital assistant in which illustrative embodiments may be implemented.

FIG. 7 a block diagram of a personal digital assistant in which illustrative embodiments may be implemented. Personal digital assistant 700 is an example of a PDA, such as personal digital assistant 600 in FIG. 6, in which code or instructions implementing the processes of the illustrative embodiments may be located. Personal digital assistant 700 is a wireless communications enable mobile computing device. Display adapter 708, keypad adapter 710, storage 712, and audio adapter 714 also are connected to bus 702. Cradle link 716 provides a mechanism to connect personal digital assistant 700 to a cradle used in synchronizing data in personal digital assistant 700 with another data processing system. A keypad is enabled by keypad adapter 710. The keypad may be a keypad and/or buttons. A display is enabled through display adapter 708. The display may be any type of display device including a liquid crystal display (LCD) or any other known displays. Further, display adapter 708 also includes a mechanism to receive user input from a stylus when a touch screen display is employed.

Personal digital assistant 700 includes a bus 702 to which processor 704 and main memory 706 are connected. Processor 704 is connected by bus 702 to transmitter 718, receiver 720, and audio processor 722. Transmitter 718 and receiver 720 are coupled to a telephone signal by couple 724 to provide full duplex communication. The telephone signal may be provided by an antenna. Audio adapter 714 provides basic analog audio outputs to speaker 732 and accepts analog audio inputs from microphone 734. Received signals are demodulated and decoded by receiver 720. Transmitter 718 encodes and modulates signals passed to it by processor 704 or audio adapter 714. The output of the transmitter is amplified by amplifier 736 to control the power level at which the signal is transmitted.

Processor 704 or audio adaptor 714 may detect audible call status information and call status codes received by receiver 720. Main memory 706 may include a lookup table associating call status information or call status codes with visual call status information, such as text messages. Processor 704 detects or receives a call status code and displays an appropriate call status message on a display associated with display adaptor 714.

An operating system runs on processor 704 and is used to coordinate and provide control of various components within personal digital assistant 700 in FIG. 7. The operating system may be, for example, a commercially available operating system such as Windows CE, which is available from Microsoft Corporation. Instructions for the operating system and applications or programs are located on storage devices, such as storage 712, and may be loaded into main memory 706 for execution by processor 704.

Those of ordinary skill in the art will appreciate that the hardware in FIG. 7 may vary depending on the implementation. Other internal hardware or peripheral devices, such as flash ROM (or equivalent nonvolatile memory) or optical disk drives and the like, may be used in addition to or in place of the hardware depicted in FIG. 7.

The methods of the illustrative embodiments may be performed in a data processing system, such as data processing system 100 shown in FIG. 1, data processing system 200 shown in FIG. 2, or any computing device depicted or described in FIGS. 1-7, such as a cellular phone or a personal digital assistant. The hardware in FIGS. 1-7 may vary depending on the implementation. Other internal hardware or peripheral devices, such as flash memory, equivalent nonvolatile memory, or optical disk drives and the like, may be used in addition to or in place of the hardware depicted in FIGS. 1-7. Also, the processes of the illustrative embodiments may be applied to a multiprocessor data processing system.

A mobile computing device is a computing device that is compact enough to be held in one or two human hands. For example, a mobile computing device includes laptops, tablet computers, cellular phones, smart watches, and personal digital assistants, also known as palmtops and PDAs. Many mobile computing devices now have baseband processors or transceivers that provide receiver and transmitter operations for wireless communications through the device, such as telephone calls. Wireless communications enabled mobile computing devices are typically capable of performing a number of functions, including caller identification (caller ID) and voice mail features.

A voice mail service generally operates by sending a prerecorded message to a caller when a user is unable to answer a phone call. A user may be unable to answer the phone for a number of reasons. For example, the user may be talking to someone else on the phone or may be in a meeting or conference that cannot be disrupted by accepting a phone call. During these circumstances, current voice mail systems send the same prerecorded or default message to all callers. The prerecorded response message typically states that the user is unable to answer the phone and asks the caller to leave a message. A caller is then given an opportunity to record a message for the user.

The aspects of the illustrative embodiments recognize that current voice mail and other phone answering systems do not enable a user to dynamically select a custom message from a plurality of custom messages based on the identity of the caller in order to let the caller know that the user did in fact receive the call at the time the call is received. In current answering systems, when a user is unable to answer the phone, the caller is connected to voice mail or another static answering system that sends the same response message that does not assure the caller that the user received the call. In other words, when a user is unable to answer a call from a known person, such as a spouse, child, friend, or business acquaintance, the caller receives the same static response message and has no way of knowing if the user actually received the call or is unaware of the call.

A user can be unaware of a missed call for a number of reasons, such as, the phone is turned off, the ringer was left muted or the ringer volume was left turned down low by mistake, the phone was lost or left somewhere, the phone is out of power, or any other reason that could cause a user to be unaware of an incoming call. A caller that is uncertain as to whether the user is aware of the missed call frequently resorts to repeatedly calling the user until the user answers the phone.

Thus, the aspects of the illustrative embodiments recognize the need for the ability to dynamically select a custom voice response message at the time a call is received. Therefore, the illustrative embodiments are directed to a computing device implemented method, apparatus, and computer program product for selecting dynamic voice response messages in a mobile computing device. In response to receiving an incoming call from a caller, the process displays a list of response messages in a set of response messages. In response to receiving a selection of a response message from the list of response messages, the process sends the selected response message to the caller.

As used herein, a computing device is a computing device, such as a mobile computing device. A computing device includes telephones, cellular phones, tablet computers, smart watches, personal navigation devices, and personal digital assistants, also known as PDAs and palmtops, and any other type of computing device shown or described in FIGS. 1-7. Thus, the illustrative embodiments can be implemented in a cellular phone, a personal digital assistant, a laptop, or any other type of computing device.

The aspects of the illustrative embodiments are presented herein in the context of a wireless communications enabled mobile computing device capable of sending and receiving communications signals through a cell tower, mobile exchange, a wireless network, or any other known or available method for sending and receiving wireless communications. However, the aspects of the illustrative embodiments are also capable of being implemented in any land-based telephone or other device capable of sending and receiving communications signals through a telephone line, fiber optic cable, or by any other known or available non-wireless method for sending and receiving communications signals, including but not limited to, sending and receiving communications signals associated with a telephone local exchange, main exchange, or international exchange.

Figure 8:
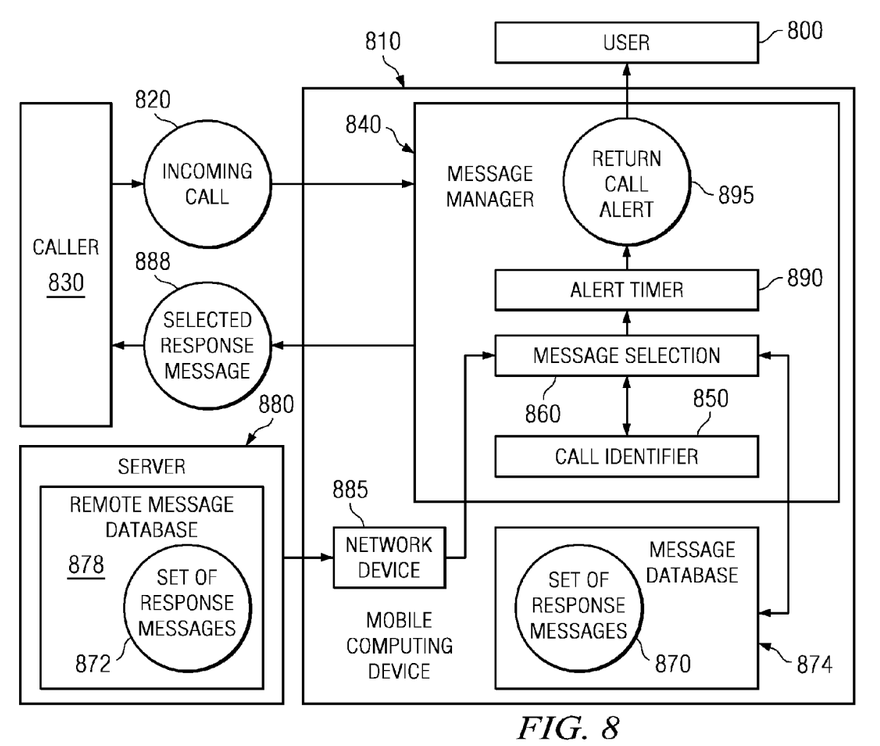
FIG. 8 is a block diagram illustrating data flow in a process for generating a proximity task-reminder alarm in a mobile computing device in accordance with an illustrative embodiment.

FIG. 8 is a block diagram illustrating data flow in a process for generating a proximity task-reminder alarm in a mobile computing device in accordance with an illustrative embodiment. User 800 utilizes mobile computing device 810 to receive incoming call 820 from caller 830. Mobile computing device 810 can be any computing device, such as any mobile computing device described in FIGS. 2-7.

In response to receiving incoming call 820, message manager 840 determines whether to send a dynamic response message to caller 830. This determination is made by message manager 840 based on whether user 800 will answer incoming call 820. The determination as to whether user 800 will answer incoming call 820 can be made based on one or more indicators. An indicator includes, but is not limited to, user selection of a voice mail option, mobile computing device is turned off, mobile computing device is set to a meeting or conference setting, an identity of a caller, or user 800 fails to answer incoming call after a preset number of rings.

A preset number of rings can be a default number of rings or a user selected number of rings. A user selection of a voice mail option can be made by selecting a control to terminate incoming call 820, selecting a control to forward incoming call 820 to voice mail, or selecting a control to automatically route all calls to a voice mail for automatically responding to incoming calls with one or more prerecorded messages. As used herein, voice mail refers to any known or available phone answering service or answering system for sending a prerecorded or pre-prepared response message to a caller when a user does not answer an incoming call. A response message is any recorded message sent to a caller, such as caller 830, when user 800 does not answer an incoming call from the caller.

An identity of caller 830 is identified by call identifier 850. Call identifier 850 is a component for displaying a name and telephone number of caller 830. Any known or available system or service for providing a name and telephone number of caller 830 may be utilized in conjunction with call identifier 850 to provide message manager 840 and/or user 800 with an identity of caller 830.

If message manager 840 determines that a dynamic response message should be sent to caller 830, message selection 860 identifies a category of callers associated with the caller's identity. For example, if call identifier 850 identifies caller 830 as wife, then message selection identifies a category of callers for caller 830 as wife, family, or any other category selected by a user for the caller's identity. User 800 can also create a category of caller for unknown callers. In such a case, if caller 830 is an unknown or unidentified caller, user 800 is presented with a set of responses associated with a category for unknown callers. In the alternative, if a caller is unknown or unidentified, a default message response is sent to caller 830.

User 800 can preset a category of caller for each caller identified in a phone directory or other directory of caller names and/or phone numbers. In addition, a category for unknown callers and/or callers not associated with any other category for callers. Message selection 860 selects a set of response messages, such as set of response messages 870 or 872 from a plurality of response messages stored in a message database, such as message database 874 and remote message database 878 based on the identified category of caller 830.

Message database 874 is a database for storing a plurality of customized response messages associated with user 800. Message database 874 is any type of database or collection of data associated with mobile computing device 810. In this illustrative example, message database 874 is located on mobile computing device 810.

Remote message database 878 is also a message database for storing a plurality of customized response messages associated with user 800, like message database 874. Remote message database 878 is any type of database for storing a collection of data that is not located on computer 810. In this illustrative example, remote message database is located on server 880.

Server 880 is any type of server, such as server 104 and 106 in FIG. 1. Server 880 can be a server associated with a telephone system or phone service provider that user 800 is a customer. In addition, server 880 can be a server on a network, such as network 102 described in FIG. 1. Mobile computing device 810 accesses remote message database 878 on server 880 through a network connection via network device 885.

Network device 878 is any type of network access software known or available for allowing mobile computing device 810 to access a network. Network device 885 connects to a network connection, such as network 102 in FIG. 1. The network connection permits access to any type of network, such as a local area network (LAN), a wide area network (WAN), or the Internet.

Message database 875 and remote message database 878 contain a plurality of customized message responses. A customized response message is a response message created by user 810 or selected by user 810 in association with a particular caller. For example, a customized response message associated with a user's wife could say, "Honey, I will call you back ASAP." User 800 can store this message in message database 874 or remote message database 878. In this illustrative example, only two message databases, 874 and 878, are depicted. However, in accordance with the aspects of the illustrative embodiments, any number of local and/or remote databases for storing a collection or set of message responses can be utilized.

User 800 creates a customized response message and links the message to set of response messages 870 and/or set of response message 872. Set of response messages 870 and/or set of response messages 872 are linked to an identified caller, such as user 800's wife. User 800 can also create additional messages for his wife, such as "I'm sorry, I'm in a meeting and will call you back in 30 minutes," and "I will call you back in 10 minutes." Thus, when caller 830 is identified as "wife," message selection 860 will display the set of response messages associated with the category of caller for "wife."

Message manager 840 displays the list of response messages in the set of response messages on a display for user 800. User 800 dynamically selects a response message from the list of response messages displayed. As used herein, a set of response messages includes a single response message, as well as two or more response messages.

In this manner, message selection 860 filters the plurality of response messages based on the caller's identity. Message manager 880 only presents the set of response messages associated with a category for the caller to user 800. User 800 is then able to select an appropriate dynamic response message from the set of response messages to be sent to caller 830. User 800 can select a particular response message from the list using a menu function, using control buttons on mobile computing device 810, using a touch screen interface, or any other known or available means for selecting an option in a list. In addition, the response messages in the set of response messages can be presented to user 800 as a menu, list of items, graphical icons, or by any other known or available means for presenting options for selection by a user.

In response to receiving a selection of a response message from the list of response messages, message manager 840 sends selected response message 888 to caller 830. Thus, caller 830 receiving dynamically selected response message is made aware that the user actually received incoming call 820. In addition, selected response message 888 can provide caller 830 with additional information, such as where the user is and when the user will return the call. For instance, in the example given above, if the user is in a meeting that will last another 30 minutes when the user's wife calls, the user can select the response message that says, "I'm sorry, I'm in a meeting and will call you back in 30 minutes." If user 800's wife calls again twenty minutes later, the user can select the response message that says, "I will call you back in 10 minutes." In this example, when user 800 selects a message containing a time interval, message manager 840 associates a return call time corresponding to the time interval. In this case, the time interval in the last selected response message is 10 minutes. Thus, message manager associates a return call time of 10 minutes with caller 830.

Alert timer 890 provides a reminder to user 800 to return a call received from caller 830 at the call return time. When the return call time is reached, alert timer 894 issues a return call alert 895 to remind user 800 to call caller 830.

Return call alert 895 is presented by mobile computing device 800 as any type of available alarm or alert type, including, but not limited to a graphic alarm, a sound alarm, a vibration alarm, a flashing visual alarm, or any combination of these alarm types. For example, alert timer 894 could generate return call alert 895 by emitting a beeping sound in addition to a flashing LED display presenting a name or category of caller 830, phone number, and/or call time for incoming call 810 on a display of mobile computing device 810. In accordance with this exemplary illustration, mobile computing device 810 presents a name and/or phone number of caller 810 and a call time of incoming call 810 to user 800 via a display when return call alert 898 is issued by alert timer 894.

If user 800 fails to select a dynamic customized response message, message selection 860 sends a default response message to caller 830. A default response message can be a traditional message stating that user 800 cannot answer the phone and ask the caller to leave a name and phone number.

In an alternative embodiment, if an identity for caller 830 is not associated with any category of caller, message selection gives the user the option to select a category of caller not associated with the caller. For example, if a user's new business associate is Mr. Jones, when a call identifier identifies a caller as Jones, the user can select a category for "business." In response, message selection 860 will present a list of response messages from set of response messages 870 associated with business. The user can then select a message from the list to be sent to Mr. Jones. In accordance with another embodiment, when user 800 selects a category of response messages for "business" callers to respond to Mr. Jones' call, message manager 840 automatically creates an association or link for Mr. Jones with the "business" caller category. Thus, when Mr. Jones calls again, message manager will automatically present the set of responses associated with the category of business callers to user 800.

In accordance with another illustrative embodiment, if a name and/or phone number of caller 830 is not associated with a category of caller, message selection 860 automatically sends the default message without presenting the user with a list of categories of callers.

In accordance with another illustrative embodiment, message selection 860 presents set of response messages 870 and/or set of response messages 872 to user 800 based on a pre-selected activity. A pre-selected activity can include, but is not limited to, a meeting, lunch, or travel. For example, if a user is traveling to an offsite meeting, the user can select a "travel" activity option. If the user receives an incoming call, message selection presents the user with a set of responses associated with a travel message response set. The response set could include response messages such as "I am reroute to the meeting and expect to arrive in 45 minutes," "I expect to arrive 20 minutes," and so forth. If the user receives a call from someone at the offsite meeting location when the user is still 20 minutes away, the user can select the "I expect to arrive 20 minutes" response message.

In accordance with another illustrative embodiment, the user can select a time-based set of response messages. A time-based set of response messages contains messages that estimate a time duration or time interval until the user will return a call. For example, a set of time-based response messages could include messages such as, "I will return your call in one hour," "I will return your call in 30 minutes," and "I will return your call in 15 minutes." The user selects a time-based response message from a set of time-based response messages. In this manner, a user can dynamically select a message stating the appropriate estimated time duration until a user will be available to return a call. The time duration or time interval included in a selected response message is associated with caller 830 to form a return call time. When the return call time is reached, alert timer 894 issues return call alert 898 to remind user 800 to call caller 830 at the time indicated in the selected response message. Thus, user 800 will not forget to return caller 830's call as indicated in the selected response message sent to caller 830.

In accordance with another illustrative embodiment, the user can enter a time of day at which the user will be available to return calls to form a return call time. For example, if the user will be in a meeting until 10:00 a.m., the user can enter the time 10:00 a.m. When incoming call 820 is received, message manager determines a time of day when incoming call 820 is received. If incoming call 820 is received at 9:45 a.m., message manager determines an estimated time difference between the time incoming call 820 is received and return call time of 10:00 a.m. In this example, the estimated return call time is 15 minutes. Message selection 860 selects set of messages 870 associated with an estimated return call time. A return call time is an estimated time when a user will return missed calls, such as incoming call 810. Each response message in set of response messages 870 based on a return call time states different time duration until the user will return a phone call. Thus, the messages in the set of response messages state, for example, "I will call back in 15 minutes," I will call back in 10 minutes," and "I will call back in 5 minutes."

Message selection 860 then selects the particular response message in set of messages 870 that indicates the user will return the call in 15 minutes. Thus, in this illustrative example, message selection 860 identifies a response message in the set of response messages that includes a time duration corresponding to an estimated time difference between a time the call is received and the return call time. Message manager dynamically sends the identified response message to the caller.

In the example provided above, the return call time was set to 10:00 a.m. Thus, when the return call time of 10:00 a.m. is reached, alert timer 894 issues return call alert 898 to user 800. In accordance with an illustrative embodiment, return call alert 898 provides a list of all missed calls. The list of missed calls can include a name, category of caller, phone number, and/or call time for each missed call.

In accordance with another illustrative embodiment, a user is presented with a first menu of categories corresponding to a caller's identity. For example, a first menu of categories includes family, friends, business, and other. A user selects a category, such as family. After selecting a category, the user is presented with a second menu of categories corresponding to a time and/or activity. For example, after selecting family, the user is presented with a list of categories such as meeting, travel, and time. If the user selects time, the user is presented with a list of response messages for family members that include estimated times until the user can return the call. The user can then select a response message for "wife" that indicates the call will be returned in 15 minutes. In this example, the selected message says, "Honey, I will call you back in 15 minutes." If the user had selected the meeting category, the user could have selected a different customized message for the user's wife, such as "Honey, I am in a meeting and will call you back as soon as I can."

Figure 9:
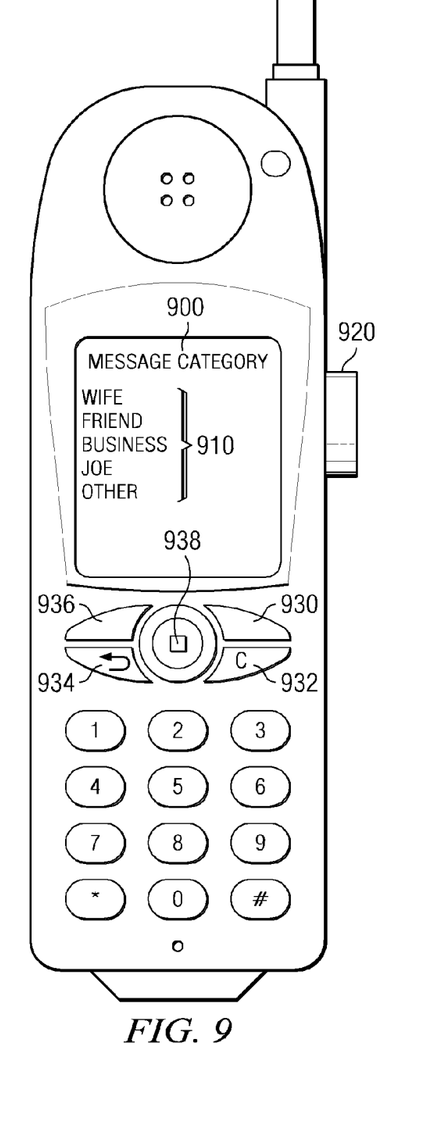
FIG. 9 is a block diagram illustrating an interface for a mobile computing device when an incoming phone call triggers a dynamic voice response message list function in accordance with an illustrative embodiment.

FIG. 9 is a block diagram illustrating an interface for a mobile computing device when an incoming phone call triggers a dynamic voice response message list function in accordance with an illustrative embodiment.

Message category 900 displays a list of categories 910 for callers, such as wife, friend, business, and other. A user can select a category by using a scroll display wheel 920 to scroll through the list. In accordance with this illustrative embodiment, a user can select a particular category by depressing the scroll wheel when the desired category is indicated by the scroll wheel display indicator.

In accordance with another illustrative embodiment, a user can select a particular category of callers to view a list of response messages associated with the selected category by using control buttons 930-938. Control buttons 930-936 are any type of keys, such as soft keys, for scrolling through a list. In addition, a user can select a category of callers by utilizing a joy stick, such as joy stick control 938. In accordance with the aspects of the illustrative embodiments, a user can utilize any known or available user interface to select a category of callers and/or select a particular response message from a list of response messages presented to the user by a mobile computing device.

In accordance with another illustrative embodiment, a category of caller is automatically selected by a mobile computing device message manager based on a name and/or phone number of the caller.

In accordance with an illustrative example, when an incoming call is received, a user can affirmatively decline to send a customized response message to the caller. A user can affirmatively indicate a selection to not send a customized response message by selecting a decline choice on a menu of response message options. In addition, a user can indicate a decline choice by selecting a default response message. Thus, in response to receiving an indicator indicating a user affirmatively declines to send a customized response message to a caller, the process of the illustrative embodiments sends a default response message to the user.

In accordance with another illustrative embodiment, if a user fails to select a customized response message from the list of response messages presented to the user in response to an incoming call, a default message is sent to the caller. In this example, the default message is sent if the user fails to select a customized response message after a predetermined period of time has passed since the list of customized response messages was presented to the user. In an alternative embodiment, the default message will be sent in response to the user failing to select a customized response message from the list of response messages after a predetermined number of rings.

Figure 10:
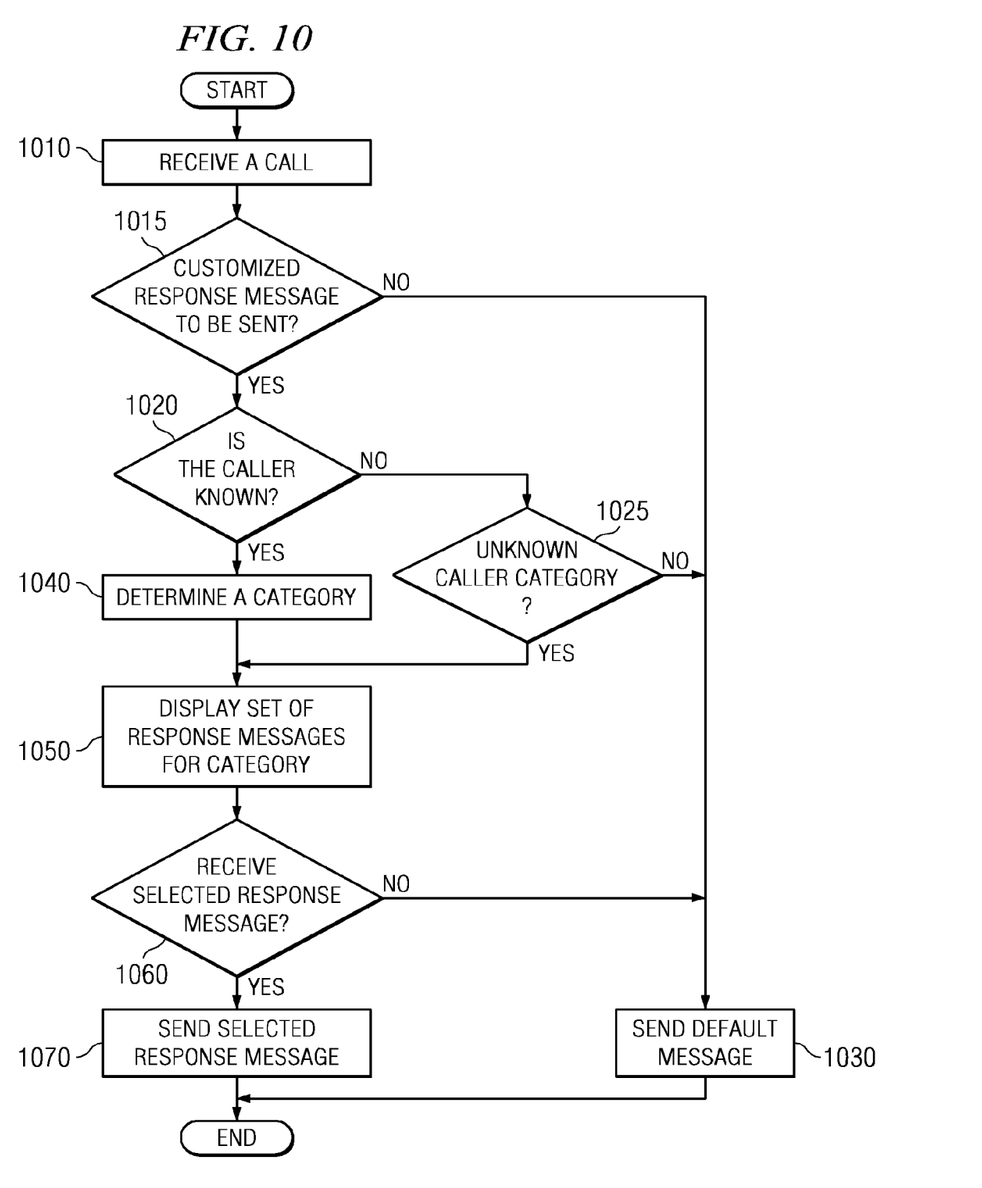
FIG. 10 is a flowchart outlining an operation of an exemplary embodiment when a user dynamically selects a customizable voice response message to respond to a phone call in accordance with an illustrative embodiment.

FIG. 10 is a flowchart outlining an operation of an exemplary embodiment when a user dynamically selects a customizable voice response message to responds to a phone call in accordance with an illustrative embodiment. The process depicted in FIG. 10 is implemented in a message application, such as message manager 840 in FIG. 8.

The process receives a call (step 1010). The process determines if a customized response message is to be sent (step 1015). This determination is made based on indicator indicating that the user will not answer the phone, the phone is turned off, the user selects to route the call to voice mail, or any other indicator indicating that a user will not answer the incoming call.

If the process determines that a customized response message is to be sent, the process determines if the caller is a known caller name and/or phone number (step 1020). If the caller is not known, the process determines if a category for unknown callers is available (step 1025). If a category for unknown caller is not available, the process sends a default message to the unknown caller (step 1030) with the process terminating thereafter.

Returning now to step 1025, if a category of unknown callers is available, the process displays the set of response messages for the category of unknown callers (step 1050). The process then determines if a selection of a message response is received from user (step 1060). If a selection of a message response is not received after a predetermined period of time or a predetermined number of rings, the process sends a default message (step 1030) with the process terminating thereafter.

Returning now to step 1060, if the process receives a selection of a response message from the set of response messages associated with unknown callers, the process sends the selected response message to the caller (step 1070) with the process terminating thereafter.

Returning now to step 1020, if the caller is a known or identified caller name and/or caller phone number, the process determines a category for the caller based on the caller's identity (step 1040). The process then displays a set of response messages to the user that is associated with the category of caller (step 1050). The process determines if a user selection of a response message from the set of response messages is received (step 1060). If a user selection of a response message is not received, a default message is sent to the caller (step 1030) with the process terminating thereafter.

Returning now to step 1060, if a selected response message is received from the user, the process sends the selected response message to the caller (step 1070) with the process terminating thereafter.

Returning now to step 1015, if the process determines that a customized message is not to be sent the process sends a default message to the caller (step 1030) with the process terminating thereafter.

In accordance with another embodiment, if a category of unknown caller's is not available, the user is presented with a list of available categories of callers and given the opportunity to select an appropriate category for the unknown or unidentified caller.

Thus, the illustrative embodiments provide a computer implemented method, apparatus, and computer program product for dynamically selecting a voice response message in response to a phone call. The aspects of the illustrative embodiments enable a caller to receive a custom message that provides a caller with an acknowledgement that the user actually is aware of the call. In addition, the dynamic response messages enable a user to provide a caller with additional information regarding the reason the user is unable to answer a call, rather than simply providing a static message that simply says leave a message and I will call you back. Moreover, the illustrative embodiments permit a user to filter possible response message choices based on a caller's identity, an activity, an estimated time until a user can return a phone call, and/or any other category or criteria for filtering message responses for selection by a user.

The flowchart and block diagrams in the figures illustrate the architecture, functionality, and operation of some possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, the program for use by or in connection with the instruction execution system, apparatus, or device.

The medium can be an electronic, magnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computing device implemented method for generating dynamic voice response messages in a mobile computing device, the computer implemented method comprising:
    responsive to receiving an incoming phone call on the mobile computing device from a caller,
    identifying a category of callers associated with the caller based on an identity of the caller;
    responsive to not identifying a category of callers associated with the caller, sending a default response message to the caller;
    responsive to identifying a category of callers associated with the caller, selecting a set of response messages for display from a plurality of response messages based on the identified category of callers associated with the caller, wherein each response message in the set of response messages is presented to a user in a menu;
    displaying the set of response messages in a display of the mobile computing device, wherein the set of response messages includes two or more response messages;
    receiving a selection of a response message from the set of response messages that includes a return call time, wherein the return call time indicates a time when the user will return calls, and wherein each response message in the set of response messages includes a time duration until the user will return a call;
    identifying a response message in the set of response messages that includes a time duration corresponding to an estimated time difference between a time the incoming phone call was received and the return call time; and
    sending the identified response message to the caller.

2. A computer program product comprising:
    a computer-readable storage medium having computer-executable program code stored therein for generating dynamic voice response messages in a mobile computing device, the computer program product comprising:
        computer-executable program code for identifying a category of callers associated with a caller based on an identity of the caller in response to receiving an incoming phone call on the mobile computing device from the caller;
        computer-executable program code for sending a default response message to the caller in response to not identifying a category of callers associated with the caller;
        computer-executable program code for selecting a set of response messages for display from a plurality of response messages based on the identified category of callers associated with the caller in response to identifying a category of callers associated with the caller, wherein each response message in the set of response messages is presented to a user in a menu;
        computer-executable program code for displaying the set of response messages in a display of the mobile computing device, wherein the set of response messages includes two or more response messages;
        computer-executable program code for receiving a selection of a response message from the set of response messages that includes a return call time, wherein the return call time indicates a time when the user will return calls, and wherein each response message in the set of response messages includes a time duration until the user will return a call;
        computer-executable program code for identifying a response message in the set of response messages that includes a time duration corresponding to an estimated time difference between a time the incoming phone call was received and the return call time; and
        computer-executable program code for sending the identified response message to the caller.

3. An apparatus for generating dynamic voice response messages in a mobile computing device, the apparatus comprising:
    a bus;
    a storage device connected to the bus, wherein the storage device contains a computer usable program product;
    a processor unit connected to the bus, wherein the processor unit executes the computer usable program product to identify a category of callers associated with a caller based on an identity of the caller in response to receiving an incoming phone call on the mobile computing device from the caller; send a default response message to the caller in response to not identifying a category of callers associated with the caller; select a set of response messages for display from a plurality of response messages based on the identified category of callers associated with the caller in response to identifying a category of callers associated with the caller, wherein each response message in the set of response messages is presented to a user in a menu; display the set of response messages in a display of the mobile computing device, wherein the set of response messages includes two or more response messages; receive a selection of a response message from the set of response messages that includes a return call time, wherein the return call time indicates a time when the user will return calls, and wherein each response message in the set of response messages includes a time duration until the user will return a call; identify a response message in the set of response messages that includes a time duration corresponding to an estimated time difference between a time the incoming phone call was received and the return call time; and send the identified response message to the caller.

* * * * *